United States Patent [19]
Cripe

[11] Patent Number: 6,082,036
[45] Date of Patent: Jul. 4, 2000

[54] DECOY

[76] Inventor: James A. Cripe, 2685 E. Driftwood Dr., Coeur d'Alene, ID 83814 Post Falls, Id. 83854

[21] Appl. No.: 09/429,800

[22] Filed: Oct. 29, 1999

Related U.S. Application Data

[63] Continuation of application No. 09/007,299, Jan. 14, 1998, abandoned.

[51] Int. Cl.$^7$ .......................... A01M 31/06; G09F 15/00
[52] U.S. Cl. ........................................ 43/3; 43/2; 40/606
[58] Field of Search ................. 43/2, 3; 40/610, 40/606, 124.01, 124.08, 124.05, 124.09, 124.12, 124.14, 124.16, 124.17, 124.191, 800, 624; D19/7; D20/32, 31, 40; D22/125; D21/595, 608; D11/135, 142

[56] References Cited

U.S. PATENT DOCUMENTS

| | | | |
|---|---|---|---|
| D. 122,397 | 9/1940 | Herlihy | D21/595 |
| D. 122,402 | 9/1940 | Herlihy | D21/595 |
| D. 128,133 | 7/1941 | Bendersky | D21/595 |
| D. 128,134 | 7/1941 | Bendersky | D21/595 |
| D. 129,406 | 9/1941 | Whittlesey | D20/30 |
| D. 143,653 | 1/1946 | Friedman | D28/64.1 |
| 282,851 | 8/1883 | Danz, Jr. | 43/3 |
| 364,573 | 6/1887 | Brinkop | 43/3 |
| 760,683 | 5/1904 | Coudon | 43/3 |
| 1,062,713 | 5/1913 | Johnson | 43/3 |
| 1,185,164 | 5/1916 | Batcher . | |
| 1,316,566 | 9/1919 | Fauble | 43/3 |
| 1,368,483 | 2/1921 | Carter | 40/124.191 |
| 2,011,480 | 8/1935 | Gazalski et al. | 43/3 |
| 2,435,083 | 1/1948 | Johnson | 43/3 |
| 2,450,572 | 10/1948 | Ballard | 43/3 |
| 2,746,196 | 5/1956 | Karr | 43/3 |
| 2,757,468 | 8/1956 | Cain | 40/124.16 |
| 2,885,813 | 5/1959 | Kratzert | 43/3 |
| 3,029,541 | 4/1962 | Palmer | 43/3 |
| 3,469,335 | 9/1969 | Leigh | 40/124.1 |
| 3,707,798 | 1/1973 | Tryon | 43/3 |
| 4,120,110 | 10/1978 | Aeschliman | 43/3 |
| 4,251,937 | 2/1981 | Curley | 43/3 |
| 4,845,872 | 7/1989 | Anderson | 43/3 |
| 5,293,709 | 3/1994 | Cripe | 43/3 |
| 5,307,580 | 5/1994 | Farmer | 40/606 |
| 5,433,156 | 7/1995 | Hutchison | 108/51.3 |
| 5,572,823 | 11/1996 | Savaria | 43/2 |
| 5,839,651 | 11/1998 | Teags et al. | 229/125.32 |

FOREIGN PATENT DOCUMENTS

| | | | |
|---|---|---|---|
| 478235 | 11/1951 | Canada | 43/3 |
| 481918 | 3/1952 | Canada | 43/3 |
| 642977 | 6/1962 | Canada | 43/3 |
| 712760 | 7/1965 | Canada | 43/3 |
| 2806 | of 1884 | United Kingdom | 43/3 |

OTHER PUBLICATIONS

Herter's Catalog, publication date unknown.
Copy of Photograph, "WF 602 Ice Stand".

*Primary Examiner*—Michael J. Carone
*Assistant Examiner*—Son T. Nguyen
*Attorney, Agent, or Firm*—Wells, St. John, Roberts, Gregory & Matkin, P.S.

[57] ABSTRACT

A decoy is described in which a base is formed as a silhouette of at least one animal. A preferred form includes an image of one animal visually identifiable on the base and part of at least a second animal on the same base, thereby creating a visual image of at least two animals. In one preferred form, the sheet includes opposed liners separated by internal flutes forming elongated chambers extending at least partially across the sheet. A seal closes ends of a number of the elongated chambers renders the base buoyant in water. A support member is shaped to be frictionally received within one of the elongated chambers to extend from the base to a remote end. In a preferred form, a ballast member is mounted at the remote end of the support member.

16 Claims, 6 Drawing Sheets

FIG. 1

DECOY

RELATED PATENT DATA

This patent is a continuation of U.S. patent application Ser. No. 09/007,299, which was filed on Jan. 14, 1998, now abandoned.

TECHNICAL FIELD

The present invention relates to decoys for attracting wild game.

BACKGROUND OF THE INVENTION

Silhouette decoys are gaining popularity, especially in the waterfowl hunting sports. Thin silhouette decoys are compact, easy to store and transport, lightweight, and work very effectively to attract game. Still, improvements are desirable.

For example, a single decoy is typically used to represent a single animal. Thus a stand set up to represent a flock of, say 18 ducks will require 18 decoys. Each decoy must be individually carried and set up in the stand. Yet it is always desirable to minimize the number of decoys used to reduce the set up time and ease transport efforts to and from the hunt site. Thus it becomes desirable to at least give the impression to live animals of a large flock in a stand of decoys, while minimizing the number of actual decoys. In the past, this goal has been unattainable due to the construction of standard one and three dimensional decoys.

The present decoy, described in greater detail below, provides the appearance of several animals in a single decoy. This is done by adding visually identifiable features of one or more animals to a primary image on a single decoy base. For example a primary shape on a decoy base may be a single duck, with features of the duck body prominently showing. But by adding even one identifiable feature (say the head and neck) of another duck to the decoy base, the appearance is immediately changed from just the primary image (one duck) to a combination of images in which the primary image is visually dominant, but the added identifiable feature gives the visual impression of another duck behind the primary image.

Thus a single duck decoy will provide a single visual image of two ducks. By simply adding an easily recognizable feature, a single decoy can perform the same function as two or more separate decoys. Of course it is not desirable to provide every decoy in a group with such multiple features, but a certain number of decoys in a stand could provide this feature and significantly reduce the actual number of decoy bodies required for the stand. For example, a number of, say 14 decoys may be used to visually imitate a stand of 18 animals. The hunter need only purchase 14 decoys, but is able to set up an 18 decoy stand.

Corrugated plastic board has been used in the past for construction of one dimensional silhouette decoys. The plastic is amenable to printing processes by which an animal image is screened or otherwise secured to the plastic base. The plastic is also light weight and is very weather resistant. However, it is not buoyant, nor will it stand on "edge" to present the silhouette in a normal appearing position in the water. The open corrugations will allow free flow of water into the base and the decoy will sink. As a result, one dimensional silhouette decoys are not used in deep water without additional flotation.

As a recognized solution to the flotation problem, flotation frames have been developed to support one or more silhouette decoys in an apparently floating, upright condition. On which one or more decoys must thus be provided with flotation if they are to be used in deep water. To provide flotation, a separate flotation frame is commonly provided that must be assembled and attached to the decoys. Such frames are bulky and time consuming to assemble. Further, they are fairly visible in the water and detract from the effectiveness of the decoys.

A need therefor exists for a silhouette form of decoy that is buoyant to enable use in deep water.

The present invention fills the above need by providing a buoyant decoy body that will readily float in deep water. The present decoy body will float with its silhouette images effective simulating the desired waterfowl.

BRIEF DESCRIPTION OF THE DRAWINGS

Preferred embodiments of the invention are described below with reference to the following accompanying drawings.

FIG. 3 is a side elevation view showing three images;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present decoy is identified in general in the drawings by the reference numeral 10. The decoy 10 is intended to present a visual image or images of a selected animal or animals. The particular animal image may vary in numbers of animals depicted. Further, the image or images, may be provided in various forms. For example, the illustrated images depict ducks. Various other images may include turkeys, geese, crows, or any other image or images that may be useful as a decoy.

The image or images used to depict a visual representation of one or more animals may be produced by hand or by any appropriate image reproduction process. It is preferred, however, that the image or images be photographic images. As used herein, the term "photographic image" is defined herein to include any form of image formed using any form of photographic imaging as one step in the image producing process. Thus the photographic image may be a pure photographic print produced from one or more photographic negatives or transparencies, a retouched photograph, a reproduction of a photograph, or any image that produced in whole or in part using photographic processes.

In all exemplary embodiments, the present decoy will include a base. In a preferred form, the base is a relatively flat sheet 14, but could take a three dimensional form. The base is used to support one or more images, preferably on both sides of the sheet. Most preferably, the same image or images will be a mirror image or images from the opposite side of the sheet.

Figure 6:
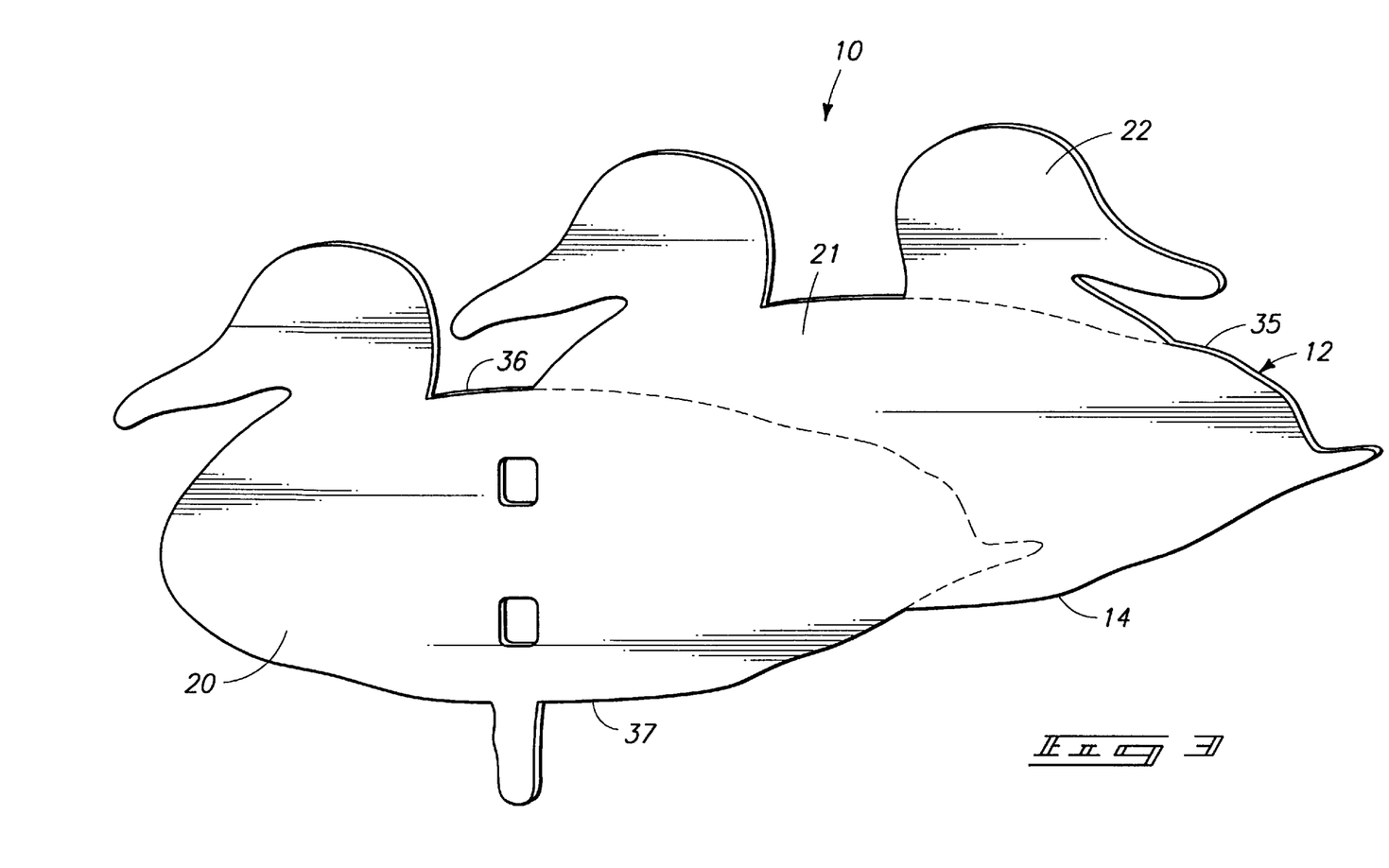
FIG. 6 is a operational view of a version of the present decoy floating in water with a ballast in place.

In the example illustrated in FIG. 6, a single first image 20 is shown. In examples illustrated in FIGS. 1–4, a first image 20 is shown along with at least a second image 21, visually identifying multiple animals. It is preferred that the first image visually identify nearly a complete animal, while the second image identifies an easily recognizable part of an animal, such as a head portion that is substantially coplanar on the flat sheet with the first image.

It should be noted however, that other anatomical parts of additional animals may be used, so long as a visual representation of two or more animals is presented on the single base. Thus, regardless of the anatomical part or parts portrayed, a single base will present visual images convincing to animals that two or more like animals are present, with one or more being partially visually obscured by the primary, first image 20. For example, FIG. 3 illustrates a base 12 including a first image 20 showing substantially the full body of a duck, a second image 21 which appears to be a whole animal partially visually obstructed by the first image, and a third image 22 which also gives the appearance or an animal that is partially visually obstructed by the second animal.

Of course the number of images completed in the above fashion could continue almost indefinitely, but as a practical matter, it is preferred that no more than 4 or 5 images be shown. In fact, it is preferable that a stand of decoys be provided in a mix, in which the majority of decoys in the stand are single image decoys, fewer including double images and still fewer displaying more than two images.

It is pointed out that the present decoy 10 with multiple images may be produced on any appropriate base, including but not limited to three dimensional forms, or on flat or curved solid sheet material forms.

In illustrated examples herein the base sheet 14 is comprised of corrugated plastic. An example of a particularly appropriate material is generally referred to as "profile" and is manufactured from either high density polyethylene or polypropylene with opposed liners 28, 29 that define the face surfaces separated by parallel "I-beam" shaped flutes 30 that extend at least partially across the sheet. Most profile type corrugated plastic sheet is produced by extrusion methods in which the flutes 30 are integral with the liners 28, 29. The exemplary sheet material is particularly suitable since the plastic material is unaffected by water, is lightweight, and is suitable for a number of printing processes by which the above discussed images may be applied.

It is pointed out that while the above described profile corrugated sheet is preferred, forms of the present invention may make use of other forms of plastic corrugated sheet material. For example, laminated corrugated plastic may be used, in which two outside liners are fused or otherwise joined to a corrugated core. This form of sheet is similar in appearance to conventional corrugated fiberboard or "cardboard".

The flutes 30 form a number of chambers 31 with the liners 28, 29. These chambers may be selectively closed by a seal 34 thereby forming air pockets within the base to render the decoy buoyant. The decoy 10 may thus be used on land or on water, as will be better understood below.

Figure 7:
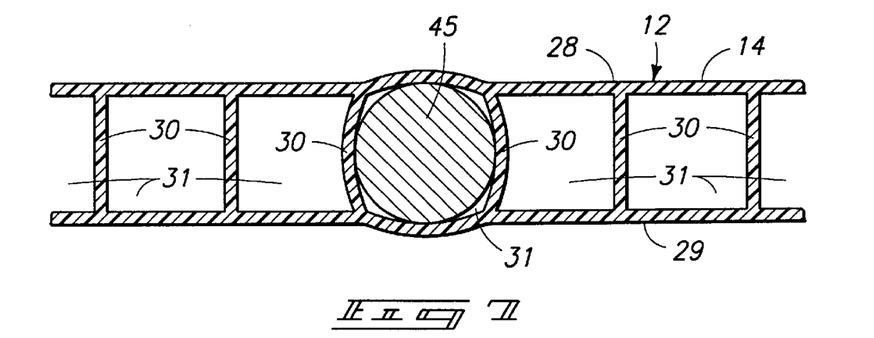
FIG. 7 is an enlarged sectional view taken along line 7—7 in FIG. 6.

FIGS. 6 and 7 exemplify a form of seal in which the liners and adjacent parts of the internal flutes are compressed and joined to form the seal. One preferred method of producing such a seal is by sonic welding.

It is pointed out that the seals could be produced by other known methods or apparatus. For example, the exposed ends of the chambers could be dipped, coated or otherwise closed by a material such as molten wax, a liquid resin, tape, or another appropriate material that would effectively hermetically seal enough of the chambers to render the decoy buoyant.

The sheet material may be die-cut or otherwise shaped to produce a peripheral edge 35 that advantageously visually identifies a silhouette of one or more animals. The cut is oriented in such a manner that the internal flutes 30 run across the base 12 in a substantially vertical direction, extending between a top portion 36 and a bottom portion 37 of the perimeter. Flutes 30 oriented in this manner facilitate use of a support member 44 (described in greater detail below) and provide maximum stability in a substantially vertical direction.

Although it is preferred that the seal 34 extend about the entire perimeter of the base (thereby converting all the chambers to flotation chambers and lending maximum stability and buoyancy to the decoy) it is possible that only the bottom portion of the perimeter be sealed. With the chambers oriented substantially vertically, the bottom-sealed chambers will function adequately to provide flotation. However it is most preferred that each sealed chamber be sealed at both ends, or at least at two places along the chamber length. This produces a closed air pocket that will not accumulate water or debris that could negatively affect flotation.

Preferred forms of the present decoy include a support 44 with at least a part thereof shaped to be frictionally received within one of the elongated chambers 31. The preferred support 44 will thus extend from the base to a remote end that is adapted to engage either the ground surface or water and provide desired support to the base 12.

Figure 8:
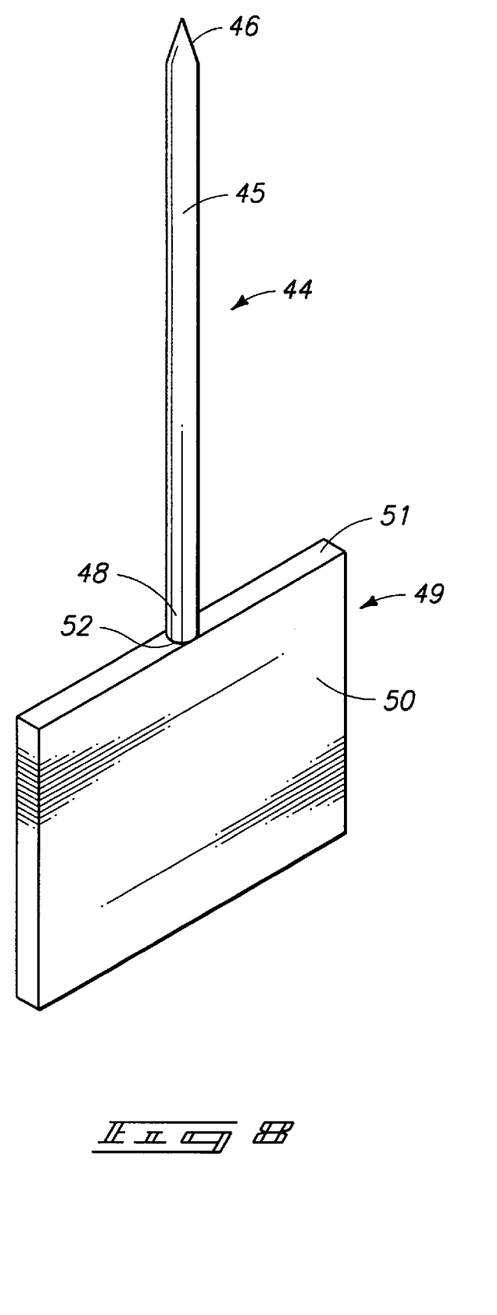
FIG. 8 is a detail perspective view of a support rod and ballast.

A preferred support 44 is shown in FIGS. 6 and 8 including an elongated rod 45 that extends from a top end 46 to a bottom end 48. The top end 46 is preferably shaped to pierce the sheet, particularly the seal 34. A portion of the rod immediately below the top end is configured to be frictionally received within a selected one of the chambers 31 (see FIG. 7). To this end, the cross sectional dimension of the rod is selected to be slightly greater than the width of a chamber 31 such that the flutes and liners are slightly distorted by the rod upon insertion. This frictional fit assures the base will stay in place on the rod and that the rod will not easily fall from engagement or rotate with respect to the base.

Figure 1:
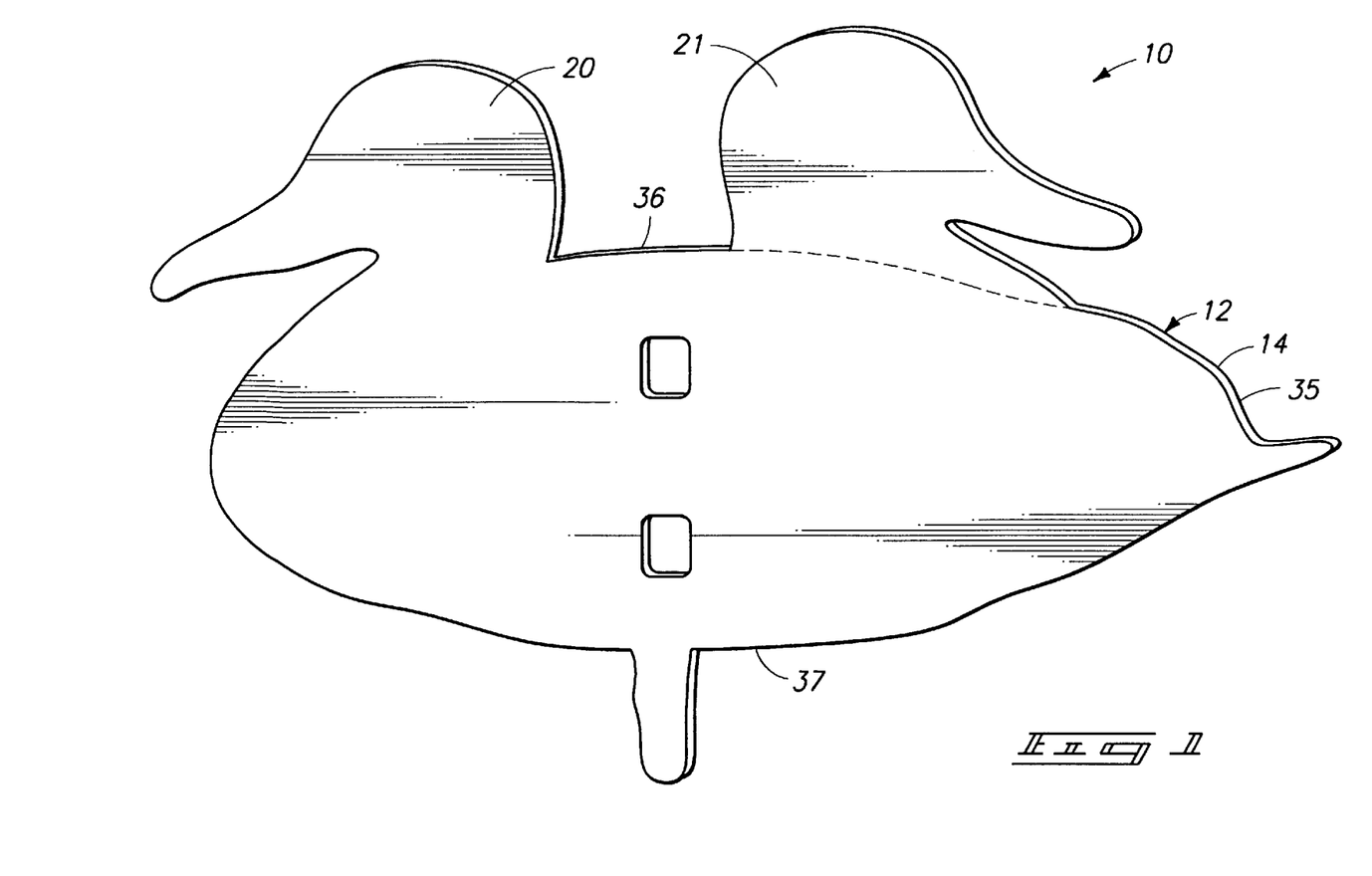
FIG. 1 is a side elevation view of the present decoy in one form showing two images on a single base.
Figure 2:
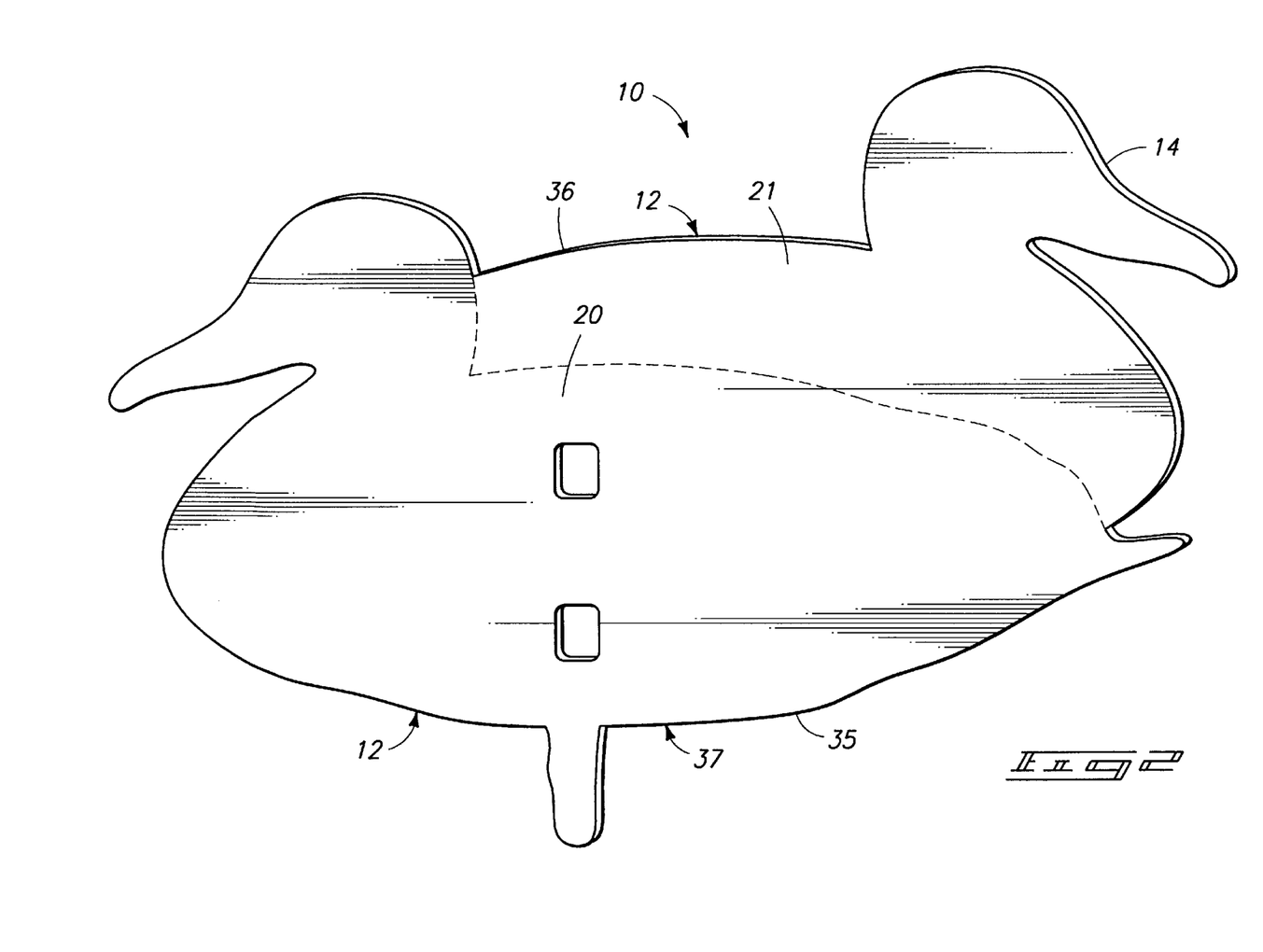
FIG. 2 is a side elevation view showing two images in different visual spatial relation.
Figures 4, 5:
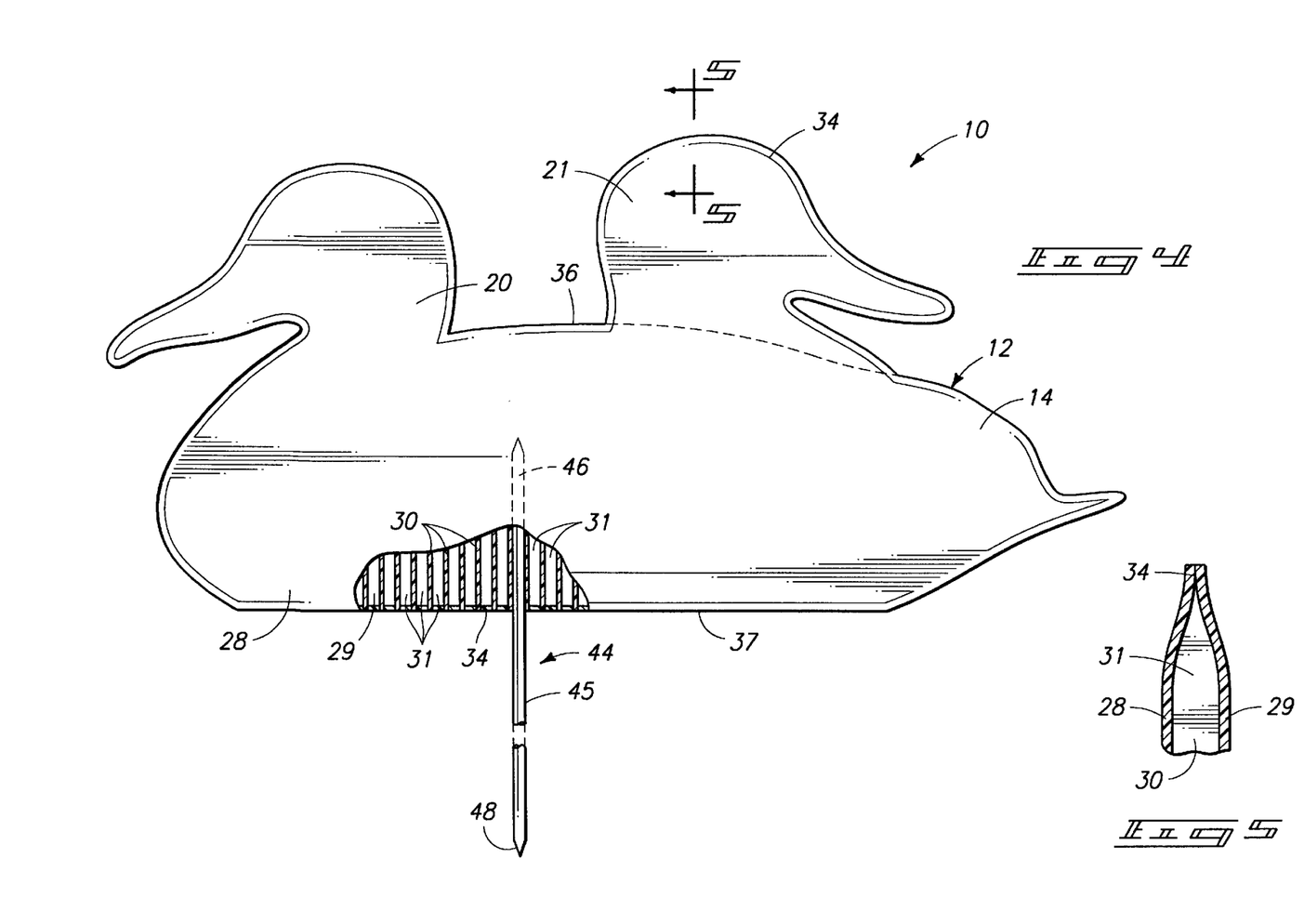
FIG. 4 is a side elevation view of a preferred form of the invention showing a portion of a liner broken away to show flutes underneath and a support.
FIG. 5 is an enlarged detail sectional view taken along line 5—5 in FIG. 4.
Figure 9:
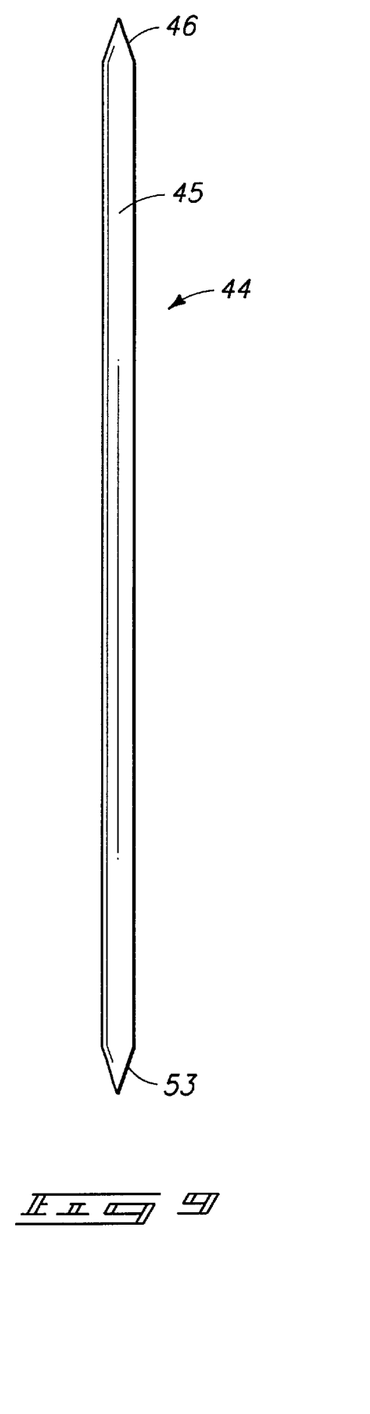
FIG. 9 is a detail perspective view of a support rod without ballast.

An embodiment of the rod shown in FIGS. 4 and 9 includes a bottom end 48 with a point 53 to ease driving into the ground surface. In this form, the top end of the rod will be received in a selected one of the chambers and the bottom end will be driven into the ground so the base is supported above the ground surface in a desired orientation.

An embodiment of the support shown in FIGS. 6 and 8, includes the rod and a ballast 49 mounted to the rod at its bottom end. This form is primarily intended for use with the decoy in conditions where the decoy is to float in deep water (where the water depth is greater than the length of the rod).

The ballast 49 is preferred to be in the form of a sheet 50, most preferably formed of metal. The sheet is suspended by the rod below the base and when in water, functions as a keel to hold the base 12 in a desired functional orientation. It is advantageous that the weight of the rod and sheet be approximately 10% to 30% of the flotation capacity of the base, so that the base will have a "water line" similar to that of the live form of animal depicted by the decoy.

In the example illustrated by FIG. 6, the base is held in an upright orientation so the bottom portion 37 of the peripheral edge is at least partially submerged, and the top portion 36 of the peripheral edge is exposed above the water surface.

It is preferred that the ballast sheet 50 be flat and have a thickness dimension equal to or less than the cross sectional dimension of the rod. By this provision, the entire decoy including the base and support may be stacked for storage or transport and the height of the stack will equal the combined thicknesses of the base sheet material.

The ballast sheet 50 includes a peripheral edge 51 that is rectangular in the illustrated examples. Other forms may be used equally as well. Further, the rod may be connected in any manner to any point on the sheet. However, it is most preferable at this time that the rod be secured to the sheet at a substantially central point along the peripheral edge. The rod 45 is secured, preferably by welding or through use of an appropriate common mechanical fastener to form a joint 52.

It is also preferred that the sheet be flat to enable use as a rudder when the decoy is deployed in deep water. The flat sheet can be rotated to any desired angle about the axis of the rod and will stay in the selected orientation due to the frictional engagement between the rod top and the engaged surfaces of the base 12. Thus the sheet 50 may be oriented as shown in FIG. 6 if it is desired for the decoy to face upstream or downstream in current. Water current acting against the flat surfaces of the ballast sheet will turn the ballast (and the remainder of the decoy) so that an edge of the ballast sheet 50 offering least resistance to the current will face upstream.

Wind direction may also be considered. Air movement against the liners 28, 29 of the base 12 will tend to turn the decoy so an edge of the decoy will face upwind. Thus wind direction and water current may be used advantageously either separately or in combination to enable desired deployment of the decoy.

Another consideration that may prove effective in decoy deployment is that the rod may be selectively secured to the base 12 at any of a selected number of positions, preferably along the bottom portion 37. For example, if the rod top is inserted at a point along the bottom portion 37 of the base toward the head portion, wind or water current will tend to turn the decoy so the head portion will face upwind or upstream. The decoy base will in effect function in a manner similar to a weather vane. Likewise, the rod may be positioned toward the tail end of the base. In this situation, the wind or current will turn the decoy so the head end will face downwind or downstream. Positioning of the rod between these extreme positions, and selective orientation of the ballast sheet may result in intermediate angular positioning.

It is pointed out that the silhouettes exemplified in the drawings represent one or more animals in an elevational, upright aspect. Other aspects are also envisioned. For example, the silhouette and accompanying image could also be produced to depict an animal as viewed from above. In this instance, one or more of the support rods could still be effectively used if desired. To accommodate the base in this orientation, the rod would be bent adjacent the top end to an angle that would permit support of the base in an appropriately desired orientation with respect to the ground or water surface.

Given the above description of preferred forms of the invention, operation may now be easily understood.

A typical stand involves a number of decoys, arranged in a group that is intended to simulate a natural, usually random pattern of animals. This is true of a stand that is to be positioned on a selected ground site or on water. Thus a number of the present decoys 10 are selected for a stand. It is preferred that the decoys have at least some differing characteristics, so some decoys in the stand will be selected in which singular images are displayed, and others will display multiple images. Decoys displaying the desired animals as viewed from different aspects (elevational and plan views, for example) may also be selected.

A selected number of decoys may be easily transported to a site in a compact stack. The supports may be transported separately, but could be previously installed. The stack height will not be varied if the preferred supports are used in which the support rod and (if used) ballast are no thicker in dimension than the decoy bases.

Once the site is selected for deployment of the decoys, the installer may easily and effectively set the decoys up for operation. Of course the nature of the set up will vary according to whether the decoys are to be used on a ground surface, or on water.

Mounting of the rod into the decoy is a simple matter of holding the decoy in a desired orientation, then pressing it downwardly against the top end of the selected rod. The rod end will pierce the decoy and, if the decoy is held upright as shown in FIG. 4, the rod will find an adjacent chamber 31 and be guided between the laminations 28, 29 and adjacent flutes 30 into the base. The base will be held securely by frictional engagement between the rod and engaged surfaces of the sheet.

It is noted that the user may select the mounting point along the base for insertion of the rod. In the example shown in FIG. 4, the rod is positioned substantially centrally along the bottom portion of the base. Another position could have been selected, especially if it became desired that the decoy pivot (on the axis of the rod) toward or away from wind.

To set up a stand in water, the user simply connects support members 44 with ballast members 49 to the decoys, and places them about the desired area. The rods are mounted to the decoy bases in the same manner as discussed above. Care may be also be taken to orient the ballast sheets 50 according to prevailing wind or current direction if the decoys are to be variously positioned.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A decoy, comprising:
    a base;
    a first substantially two-dimensional image on the base identifying a major part of a first game animal; and
    at least a second substantially two-dimensional image on the base identifying a head portion of a second game animal, the first and second images being substantially co-planar and arranged to visually suggest said at least second animal behind the first image.

2. A decoy as claimed by claim 1, wherein said first and at least second image are photographic images.

3. A decoy as claimed by claim 1, wherein said base is formed of a substantially flat sheet.

4. A decoy as claimed by claim 1, wherein said base is formed in a silhouette of the first and at least second images.

5. A decoy as claimed by claim 1, wherein the base is comprised of a corrugated plastic sheet.

6. A decoy as claimed by claim 1, wherein the base is comprised of a corrugated plastic sheet, formed by opposed liners separated by internal flutes forming elongated chambers extending at least partially across the sheet;

and further comprising a support shaped to be frictionally received within one of the elongated chambers and to extend from the base to a remote end.

7. A decoy, comprising:

a base formed of a corrugated plastic sheet;

the sheet including opposed liners separated by internal flutes forming elongated chambers extending at least partially across the sheet;

the sheet further including a seal across a number of the elongated chambers to form flotation chambers rendering the base buoyant in water;

at least one image on the base identifying an animal; and a support member shaped to be frictionally received within and longitudinally along one of the elongated chambers and to extend from the base to a remote end.

8. A decoy as set forth by claim 7, wherein the image is a photographic image.

9. A decoy as set forth by claim 7, wherein the sheet is formed as a silhouette of at least one animal.

10. A decoy as set forth by claim 7, wherein the sheet is formed as a silhouette of a first animal and a portion of at least a second animal.

11. A decoy as set forth by claim 7, wherein the sheet is formed with a peripheral edge defining a silhouette of at least one animal; and wherein the seal is formed along at least part of the peripheral edge.

12. A decoy as set forth by claim 7, wherein portions of the opposed liners and internal flutes are compressed and joined to form said seal.

13. A decoy as set forth by claim 7, wherein the sheet is formed with a peripheral edge defining a silhouette of at least one animal;

wherein the peripheral edge includes a top portion and a bottom portion;

wherein the internal flutes extend between the top and bottom portions; and wherein the seal is formed along at least part of the bottom portion.

14. A decoy as set forth by claim 7, further comprising a rod including an end shaped to pierce the sheet.

15. A decoy as set forth by claim 7, further comprising a rod having a top end shaped to be frictionally received within one of the elongated chambers and having a ballast at a bottom end.

16. A decoy as set forth by claim 7, further comprising:

an elongated rod having cross sectional dimension, a top end, and a bottom end;

the top end of the rod being shaped to be frictionally received within one of the elongated chambers;

a ballast member at the bottom end of the rod; and wherein the ballast member is comprised of a metal member having a thickness dimension approximately equal to the cross sectional dimension of the elongated rod.

\* \* \* \* \*